W. R. PARSONS.
RUFFLER FOR SEWING MACHINES.
APPLICATION FILED MAY 23, 1908.

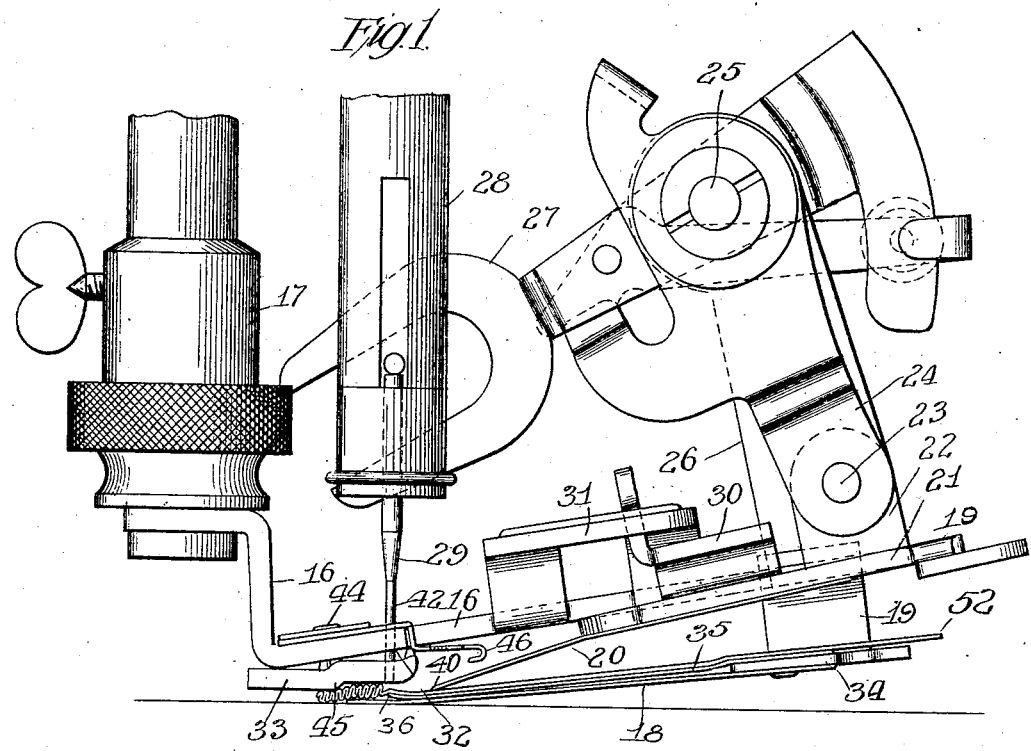
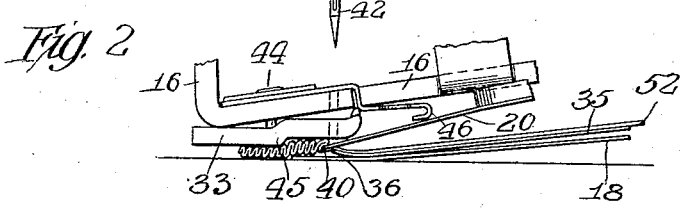
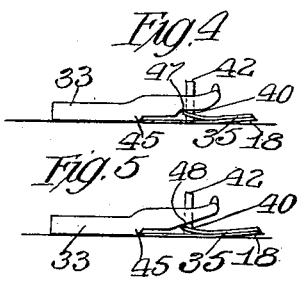
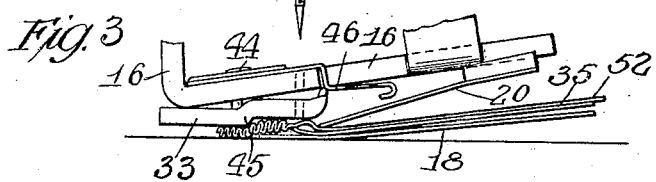
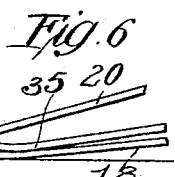
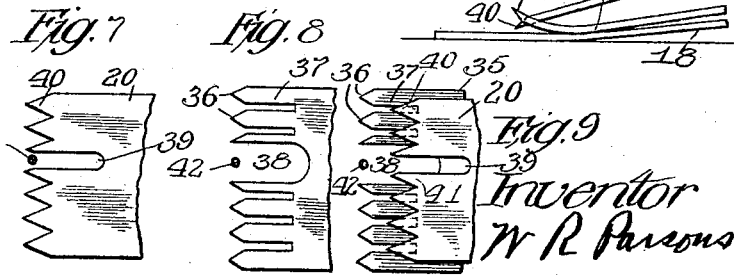

931,641.

Patented Aug. 17, 1909.

2 SHEETS—SHEET 2.

Witnesses
R. A. White
Harry R. L. White

Inventor
Winslow R. Parsons
By Jno. G. Elliott Atty.

UNITED STATES PATENT OFFICE.

WINSLOW R. PARSONS, OF CHICAGO, ILLINOIS, ASSIGNOR TO CHICAGO TITLE & TRUST COMPANY, TRUSTEE, OF CHICAGO, ILLINOIS, A CORPORATION OF ILLINOIS.

RUFFLER FOR SEWING-MACHINES.

No. 931,641.   Specification of Letters Patent.   Patented Aug. 17, 1909.

Application filed May 23, 1908. Serial No. 434,492.

*To all whom it may concern:*

Be it known that I, WINSLOW R. PARSONS, a citizen of the United States, and a resident of Chicago, in the county of Cook and State of Illinois, have invented certain new and useful Improvements in Rufflers for Sewing-Machines, of which the following is a full, clear, and exact specification.

This invention relates to that class of ruffling attachments for sewing machines in which a ruffling strip, or strip of goods to be ruffled or gathered, is supported on a separator plate and is acted upon, for the ruffling or gathering operation, by a reciprocating ruffling blade; and the invention has for its object to provide means for preventing the retraction of the ruffling strip with the ruffling blade, and thereby avoid uneven or imperfect work such as sometimes results in the operation of the rufflers at present in use; the present improved ruffler enabling the work to be done with evenness and regularity.

To this end the invention comprises a holding plate which is preferably interposed between the ruffling blade and the separator plate and which coöperates with these parts and with the presser foot of the attachment in such a manner that not only are the ruffles or gathers always of uniform size or fullness, but the ruffler is caused to operate in such a manner as to maintain the folds of the ruffle in an upright position, and substantially at a right angle to the plane of the strip from which they are formed, during their passage through the ruffler, thereby enhancing the attractiveness of the work in forming medium or full ruffles.

Figure 10:
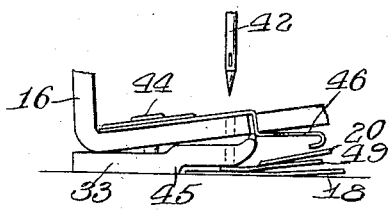
Figure 13:
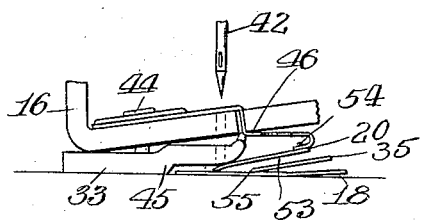
Figure 11:
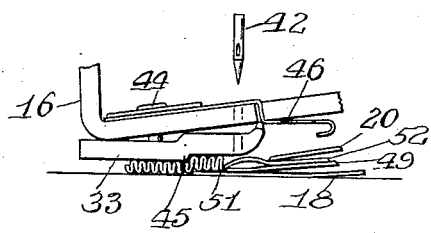
Figure 14:
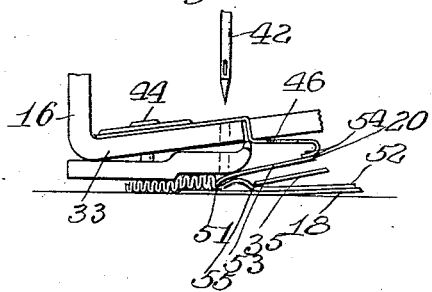
Figure 12:
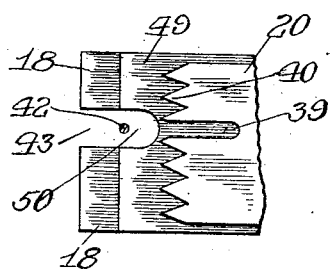
Figure 15:
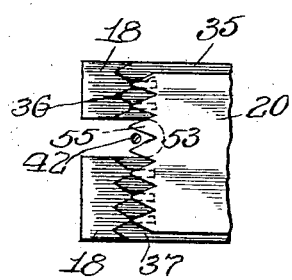

In the accompanying drawings Figure 1 is a side elevation, on an enlarged scale, of a ruffler embodying the present invention with the ruffling blade in its retracted position. Fig. 2 is a side elevation of a portion of the attachment shown in Fig. 1, but with the ruffling blade in the position it occupies at the end of the forward stroke to complete a ruffle or gather which will then be in position for the passage of the needle therethrough, and Fig. 3 is a view similar to Fig. 2 but showing the ruffling blade in a position intermediate the positions which it occupies in Figs. 1 and 2 and with the ruffle or gather partly formed. Fig. 4 is a detail side view of a preferred form of presser-foot piece for use in connection with a holding blade, and Fig. 5 is a similar view of a slightly different form of presser-foot than that shown in Fig. 4. Fig. 6 is an enlarged detail side view showing the forward end portions of the ruffling blade, the holding blade and the separator plate. Fig. 7 is an enlarged detail plan view of the forward end of the ruffling blade; Fig. 8 is a similar view at the forward end of the holding blade, and Fig. 9 is a similar view of the forward ends of the holding blade and of the ruffling blade, showing the preferred relative arrangement of intermeshing teeth of these two blades. Figs. 10 and 11 are detail views showing portions of the attachment but illustrating a slightly modified form of holding plate, and Fig. 12 is an enlarged plan view showing the forward end portions of the separator plate and of the holding and ruffling blades shown in Figs. 10 and 11. Figs. 13 and 14 are detail views, similar to Figs. 10 and 11, showing another modified form of the invention, and Fig. 15 is a plan view of the forward ends of the separator plate and of the holding and ruffling blades shown in Figs. 13 and 14.

Referring to the drawings, 16 denotes the frame of the ruffler and which frame is provided, in the usual manner, with means for convenient attachment to the presser-bar 17 of a sewing machine. Pivotally mounted on a pin 25, supported by the standard 26 forming a portion of the frame of the attachment, is an operating lever 27 forked for engagement with a roller-stud or pin carried by the needle-bar 28 of the machine, and to which needle-bar the shank 29 of the needle 42 is attached in a well-known manner. The operating lever 27 has a loose but adjustable connection of well-known construction with a pendulous lever 24 having a pivotal connection at 23 with an upward projection 22 on a carrier 21 to which the ruffling blade 20 is attached in a usual manner, so that as the said operating lever is vibrated from the needle-bar of the machine the said ruffling blade will be reciprocated back and forth for the ruffling operations. The ruffling blade carrier 21 has an overhanging part 30 provided with an upward projection extending into a slot in a portion 31 of the ruffler frame, so that the ruffling blade will be guided and steadied in its back of course, remains stationary as the ruffling described in my application No. 304,635, filed March 7, 1906.

Attached to the frame 16 is a holder or support 19 having an arm 34 to the under side of which the separator plate 18 is attached in the usual manner; and which plate, of course, remains stationary as the ruffling blade is reciprocated back and forth above the same.

To the upper side of the arm 34 of the separator plate support 19 is attached a holding blade 35 the forward end of which is provided with pointed teeth 36 having somewhat long shanks 37, and which teeth at the forward end of said holding blade are preferably curved upward, as more clearly shown in Fig. 6, for engagement with the ruffling strip 52 which passes over the said holding blade and the retraction of which, with the ruffling blade, is prevented by said teeth. The holding blade, in the preferred form of the invention, is interposed between the separator plate and the ruffling blade, so that the ruffling strip 52 will run between said holding and ruffling blades.

The holding blade 35 is preferably provided at its forward end with a slot 38, and the ruffling blade 20 is preferably provided with a relatively narrow slot 39, these slots affording proper space for the needle 42. The ruffling blade is provided at its forward end with pointed teeth 40 and 41 which are preferably so arranged relative to the teeth 36 of the holding blade as to alternate and intermesh with the latter teeth, as indicated in Figs. 6 and 9.

The improved ruffler herein shown is preferably provided with a self-adjustable presser-foot piece 33 formed separate from or independent of the frame of the attachment and secured to said frame by means of a rivet 44 beneath the head of which is a spring plate or washer which admits of certain limited self-adjusting movements of the said presser-foot piece; the latter being provided, adjacent to the forward end of the separator plate, with a shoulder 45. The recessed portion of the said presser-foot piece between said shoulder 45 and the end of the holding blade permits the ruffling blade, in coöperation with said holding blade, to form the ruffles in such a manner that they will stand up edgewise vertically as shown in the drawings, and thus enhance the attractiveness of the work.

Instead of forming the presser-foot piece 33 with a single shoulder 45 the said presser-foot piece may have, adjacent to the forward upturned end of the holding blade, a second shoulder 47 (as shown in Fig. 4) which will coöperate with said blade in preventing the retraction of the ruffling strip with the ruffling blade; or instead of forming said presser-foot piece with the said shoulder 47 it may be provided with an inclined portion 48 which will likewise coöperate with the holding plate in preventing the retraction of the ruffling strip.

The improved ruffler preferably comprises a piping guide 46, such as is fully described in my application No. 304,635, above referred to, and which is preferably secured to the frame of the ruffler by means of the rivet 44 which holds the presser-foot piece 33 in place.

As above indicated the separator plate terminates at its forward end adjacent to the shoulder 45 on the presser-foot and the holding blade terminates at its forward end at a considerable distance rearward of said shoulder, so as to assist in holding the ruffles edgewise vertically as well as to prevent the retraction of the ruffle strip with the ruffling blade. The term "forward" as herein used has reference to the direction in which work is to move, while the term "rearward" has reference to the opposite direction, or toward the position of the attendant.

Instead of a holding blade provided at its forward end with teeth, as hereinbefore described, a holding blade 49 which is formed smooth or straight at its forward end, and which is provided with a slot 50, as more clearly shown in Fig. 12, may be employed. This form of holding blade, like the holding blade 35, is slightly up-turned and terminates at its forward end at some little distance rearward of the forward end of the separator plate 18, and the smooth or straight forward end of the holding blade 29 affords a slight shoulder beyond which the ruffle being formed will be forced by the ruffling blade, as more clearly shown in Fig. 11, so that said shoulder will prevent the retraction of the ruffling strip with the ruffling blade. With this form of holding blade its forward end is preferably extended to a position slightly beyond the needle, as more clearly indicated in Figs. 10 to 11, and its forward end need be but very slightly upturned.

A holding blade with a straight or smooth forward end is well adapted for use with thin fabrics, either single or doubled, but for use with heavier or thicker fabrics a toothed holding blade is preferred, as such toothed holding blade is better adapted to prevent retraction of the heavier or stiffer fabrics with the ruffling blade.

Instead of employing a holding blade which is attached to the separator plate support, and which is interposed between the separator plate and ruffling blade, as hereinbefore described, a holding blade 53 attached by rivets 54 to the piping guide 46, and arranged above the ruffling blade, may be employed. This form of the invention is illustrated in Figs. 13, 14 and 15 which show the holding blade 53 in such position relative to the presser-foot piece 35 that the latter will press upon the same, and by coacting therewith enable the said holding blade to have a proper engagement with a ruffling strip to prevent the retraction of the latter with the ruffling blade.

Having thus described my invention I claim and desire to secure by Letters Patent:

1. In a sewing machine ruffler, the combination with a ruffling blade and means for operating the same, of a presser-foot provided on its under side with a shoulder, a separator plate terminating at its forward end adjacent to said shoulder, and a holding blade terminating at its forward end at a considerable distance rearward of said shoulder.

2. In a sewing machine ruffler, the combination with a ruffling blade and means for operating the same, of a presser-foot piece formed separate from the frame of the attachment and provided on its under side with a shoulder, a separator plate terminating at its forward end adjacent to said shoulder, and a holding blade terminating at its forward end at a considerable distance rearward of said shoulder.

3. In a sewing machine ruffler, the combination with a ruffling blade and means for operating the same, of a presser-foot provided on its under side with a shoulder, a separator plate terminating at its forward end adjacent to said shoulder, and a holding blade terminating at its forward end at a considerable distance rearward of said shoulder, said ruffling and holding blades having at their forward ends pointed intermeshing teeth.

4. In a sewing machine ruffler, the combination with a ruffling blade and means for operating the same, of a presser-foot provided on its under side with a shoulder, a separator plate terminating at its forward end adjacent to said shoulder, and a holding blade having a forward up-turned end terminating a considerable distance rearward of said shoulder, said presser-foot having, rearward of said shoulder, a part adjacent the said forward up-turned end of said holding blade and coöperating with the latter.

5. In a sewing machine ruffler, the combination with a ruffling blade and means for operating the same, of a presser-foot provided on its under side with a shoulder, a separator plate terminating at its forward end adjacent to said shoulder, and a holding blade having a forward up-turned end terminating a considerable distance rearward of said shoulder, said presser-foot having, rearward of said shoulder, a second shoulder adjacent the said forward up-turned end of said holding blade and coöperating with the latter.

6. In a sewing machine ruffler, the combination with a ruffling blade and means for operating the same, of a separator plate, a support for said plate, and a holding blade interposed between said ruffling blade and said separator plate, said ruffling and holding blades being provided at their forward ends with pointed, intermeshing teeth.

7. In a sewing machine ruffler, the combination with a ruffling blade, and means for operating the same, of a separator plate, a holding blade, and a presser-foot piece formed separate from or independent of the frame of the ruffler and provided on its under side with a shoulder adjacent the forward end of said separator plate, said presser foot piece being yieldingly secured to the foot portion of the attachment frame, so as to be self-adjusting, and having, between said shoulder and its end, a portion coöperating with said holding blade to assist the latter in preventing the retraction of the ruffling strip with said ruffling blade.

8. In a sewing machine ruffler, the combination with a ruffling blade and means for operating the same, of a separator-plate, a holding blade having an up-turned forward end, and a presser-foot piece formed separate from or independent of the frame of the ruffler and provided on its underside with a shoulder adjacent the forward end of said separator plate, said presser-foot piece having, between said shoulder and its end, a portion coöperating with said holding blade to assist the latter in preventing the retraction of the ruffling strip with said ruffling blade.

In witness whereof, I have hereunto set my hand and affixed my seal, this 21st day of May, A. D. 1908.

WINSLOW R. PARSONS. [L. S.]

Witnesses:
   JNO. G. ELLIOTT,
   M. G. FITZSIMMONS.